United States Patent [19]
Bruch et al.

[11] Patent Number: 5,014,156
[45] Date of Patent: May 7, 1991

[54] FUSED ELECTRICAL SAFETY BARRIER FOR PROTECTION OF AN ELECTRICAL LOAD PLACED IN A POTENTIALLY HAZARDOUS LOCATION

[75] Inventors: Peter Bruch, Waldenburg; Anton Schimmele, Neckarsulm, both of Fed. Rep. of Germany

[73] Assignee: R. Stahl Schaltgeräte GmbH, Künzelsau, Fed. Rep. of Germany

[21] Appl. No.: 401,636

[22] Filed: Aug. 31, 1989

[30] Foreign Application Priority Data

Sep. 21, 1988 [DE] Fed. Rep. of Germany ....... 3832068

[51] Int. Cl.⁵ .............................................. H02H 5/04
[52] U.S. Cl. .................................. 361/58; 361/104; 361/111
[58] Field of Search .................... 361/56, 58, 111, 104

[56] References Cited

U.S. PATENT DOCUMENTS

| | | | |
|---|---|---|---|
| 4,389,695 | 6/1983 | Carpenter, Jr. | 361/104 |
| 4,520,419 | 5/1985 | Locher et al. | 361/104 |
| 4,587,588 | 5/1986 | Goldstein | 361/104 |
| 4,831,484 | 5/1989 | Bruch | 361/101 |

FOREIGN PATENT DOCUMENTS

| | | |
|---|---|---|
| 1111728 | 7/1961 | Fed. Rep. of Germany . |
| 2023624 | 12/1970 | Fed. Rep. of Germany . |
| 3231143 | 2/1984 | Fed. Rep. of Germany . |

OTHER PUBLICATIONS

"Elektroanzeiger", 29th year, 1976, No. 24, pp. 589-591, article by Bensieck, Kaltleiter als selbstregelnde . . . Überlastsicherungen, (Cold Conductors as Self-Regulating Heat Elements and Destruction--Free Over-Load Safety Devices).

*Primary Examiner*—Todd E. Deboer
*Attorney, Agent, or Firm*—Frishauf, Holtz, Goodman & Woodward

[57] ABSTRACT

To protect an encapsulated fuse (9) within a wholly enclosed sealed safety barrier having a first voltage limiting circuit (10) and a current limiting circuit (15), an externally accessible high current interrupter (5), such as a fuse, positive temperature coefficient resistor (26) or circuit breaker (27) is connected in series with an input terminal, and further serially connected with a second voltage limiting circuit (6) connected downstream of the interrupter and across the safety barrier circuit, the second voltage limiting circuit having a voltage limiting response characteristic which is, preferably, the same as the first voltage limiting circuit within the barrier, and the interrupter having a response threshold which is at least as high, but may be higher than the fuse (9) encapsulated within the circuit. The combination of the second voltage limiting circuit (6) with the fuse (5) acts as a clamping circuit, in case of over-voltage or other malfunction, with respect to the encapsulated fuse (9) so that the externally accessible interrupting element can be replaced or reset, or will reset automatically to avoid replacement of the entire safety barrier.

15 Claims, 3 Drawing Sheets

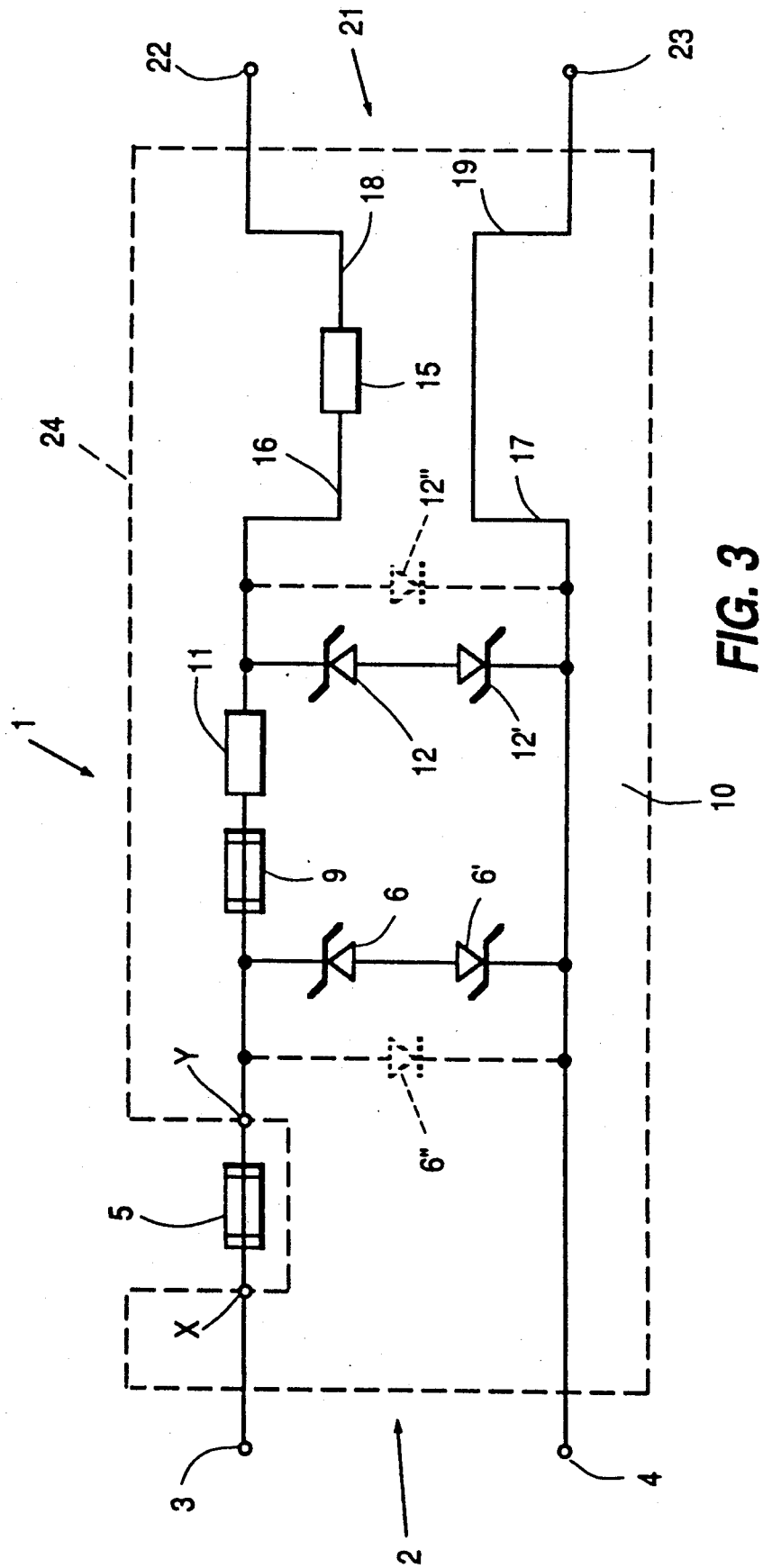

FUSED ELECTRICAL SAFETY BARRIER FOR PROTECTION OF AN ELECTRICAL LOAD PLACED IN A POTENTIALLY HAZARDOUS LOCATION

Reference to related patent, the disclosure of which is hereby incorporated by reference, assigned to the assignee of the present application: U.S. Pat. No. 4,831,484, the co-inventor hereof, Peter Bruch.

The present invention relates to a safety barrier to protect an electrical load placed in a potentially hazardous location, for example in an explosive surrounding. The barrier limits the voltage level appearing at output terminals thereof, which can be connected to the load, as well as the current flowing through the output terminals.

BACKGROUND

U.S. Pat. No. 4,831,484, by co-inventor Bruch hereof, the disclosure of which is hereby incorporated by reference, shows a safety barrier circuit which has a voltage limiting circuit using voltage limiting Zener diodes, combined with a fuse which disconnects the output circuit if the voltage at the input to the safety barrier, which would be reflected at the output terminals of the safety barrier, exceeds a threshold limit determined by the Zener diode or Zener diodes.

It has been found that, if the input voltage exceeds the Zener threshold voltage only slightly, a substantial current rise may occur. The increase in current level may be substantially above the current which can be applied at the output terminals with maximum permissible input voltage. The fuse then burns through, disconnecting the output voltage. The maximum permissible output current, even under short circuit conditions, considering the customary dimensioning of the safety barrier, is below the burn-through or, rather, the melt-through current of the fuse. Normally, therefore, the fuse will burn or, rather, melt through only in case of excessive voltage at the input to the safety barrier.

Safety barriers are so constructed that the fuse, together with the remaining structural elements, is encapsulated in a housing, and inhibiting access to the components thereof. This is required for safety reasons, and to prevent tampering with the safety barrier. If the fuse burns through or melts through, the entire safety barrier becomes unusable. To protect the rather expensive safety barrier element, it has been proposed to place an additional fuse in series with the input of the safety barrier. That additional fuse was dimensioned to have a fusing current rating smaller than the threshold current resulting in melt-through of the fuse which is encapsulated in the safety barrier. This additional fuse was intended to protect the encapsulated fuse in case of overvoltages, so that one could merely exchange the external fuse and then place the barrier again in operation, without interfering with protective regulations which determine the structure and installation of safety barriers.

It has been found that an external protective circuit including a fuse, connected to the safety barrier, did not provide the desired protection for the fuse encapsulated within the safety barrier. Over-voltages or surges may occur due to inductances in the circuit of which the safety barrier is a part and, for example, in the connecting lines to the safety barrier; then both fuses will burn through although the external fuse and the internal encapsulated fuse may have substantially different current ratings. When the internal, encapsulated fuse burns out, the entire barrier becomes useless and must be exchanged. Since barriers are expensive elements, and fuses are cheap, exchange of the entire barrier merely because the encapsulated fuse burns out is economically undesirable.

The Invention. It is an object to provide a protective circuit for a safety barrier so that, under external overvoltage or surge on pulse voltage conditions, the internal fuse forming the final protection for a load in a potentially hazardous location is protected, thereby avoiding replacement of an entire expensive circuit structure when only an inexpensive, normally replaceable element thereof burns through.

Briefly, an externally accessible current interrupting element, such as a circuit breaker, fuse or the like, is connected in series with the safety barrier, and, additionally a second voltage limiting circuit is connected between the input of the voltage limiting circuit inherent in the safety barrier and the internal fuse of the safety barrier; the external current interrupting element, such as a fuse or circuit breaker, is connected in advance of the second voltage limiting circuit and the current interrupting element is set to have a current interruption threshold which is at least as high, and may be higher than the current interruption threshold of the fuse encapsulated in the safety barrier.

The external current interrupter in combination with a second voltage limiting circuit connected electrically in advance of the internal encapsulated fuse of the safety barrier permits a construction in which the external current interrupter such as a fuse, is accessible, and hence replaceable. The encapsulated fuse within the safety barrier protects the output terminal and, to comply with safety requirements, is arranged so that it is inaccessible. Thus, it is possible to reset the circuit through the safety at low cost barrier without interfering with safety regulations since the second, externally accessible interrupting element will respond to disconnect excess voltages from the output terminal. It is not specifically necessary, even, to prevent insertion of an externally accessible fuse with a current level which is higher than the recommended fusing level; the worst that could happen is that the internal, encapsulated fuse will burn through. Even if the fuse or interrupter terminals which are externally accessible are short-circuited, the encapsulated internal fuse will respond since it of course finally sets the limiting value of the safety barrier.

In accordance with a preferred feature of the invention, the externally accessible fuse has the same or only slightly higher current response level as the internal, encapsulated fuse. Even if the second, externally accessible fuse has the same current response level as the encapsulated fuse, a larger current will flow through the externally accessible fuse than through the encapsulated fuse, if the voltage limiting circuit associated with the externally accessible fuse as well as the internal voltage limiting circuit of the safety barrier have the same voltage threshold level. The second, externally accessible fuse will thus reliably respond before the internal encapsulated fuse, thus protecting the safety barrier without, however, interfering with its safety functions.

The series circuit which includes the second, accessible fuse and the voltage limiting circuit associated therewith operates as a clamping circuit for the subsequent voltage limiting circuit of the barrier unit. Thus, the response characteristic of the accessible fuse is not critical and can be selected within wide limits; for example, the second accessible current interrupting element can be a fuse, a circuit breaker, or a positive temperature coefficient resistor of higher current rating or slower response time than the encapsulated interior fuse of the safety barrier.

The safety barrier can be designed for d-c operation of predetermined polarity, or for connection to a network of varying polarities, for example an a-c network. In accordance with a preferred feature of the invention, the voltage threshold values of the internal voltage limiting circuit of the barrier as well as of the voltage limiting circuit associated with the accessible current interrupting device are of equal nominal dimension; different dimensioning, however, may also be possible, for example the threshold level of the voltage limiting circuit associated with the accessible current interrupting device can be designed for a lower voltage level than the voltage limiting circuit of the barrier itself.

DRAWINGS

FIG. 3 is a block circuit diagram with voltage limiting independly of polarity of the input voltage;

FIG. 3a is a fragmentary diagram illustrating a modification; and

FIG. 3b is a fragmentary diagram illustrating yet another modification.

DETAILED DESCRIPTION

Figure 1:
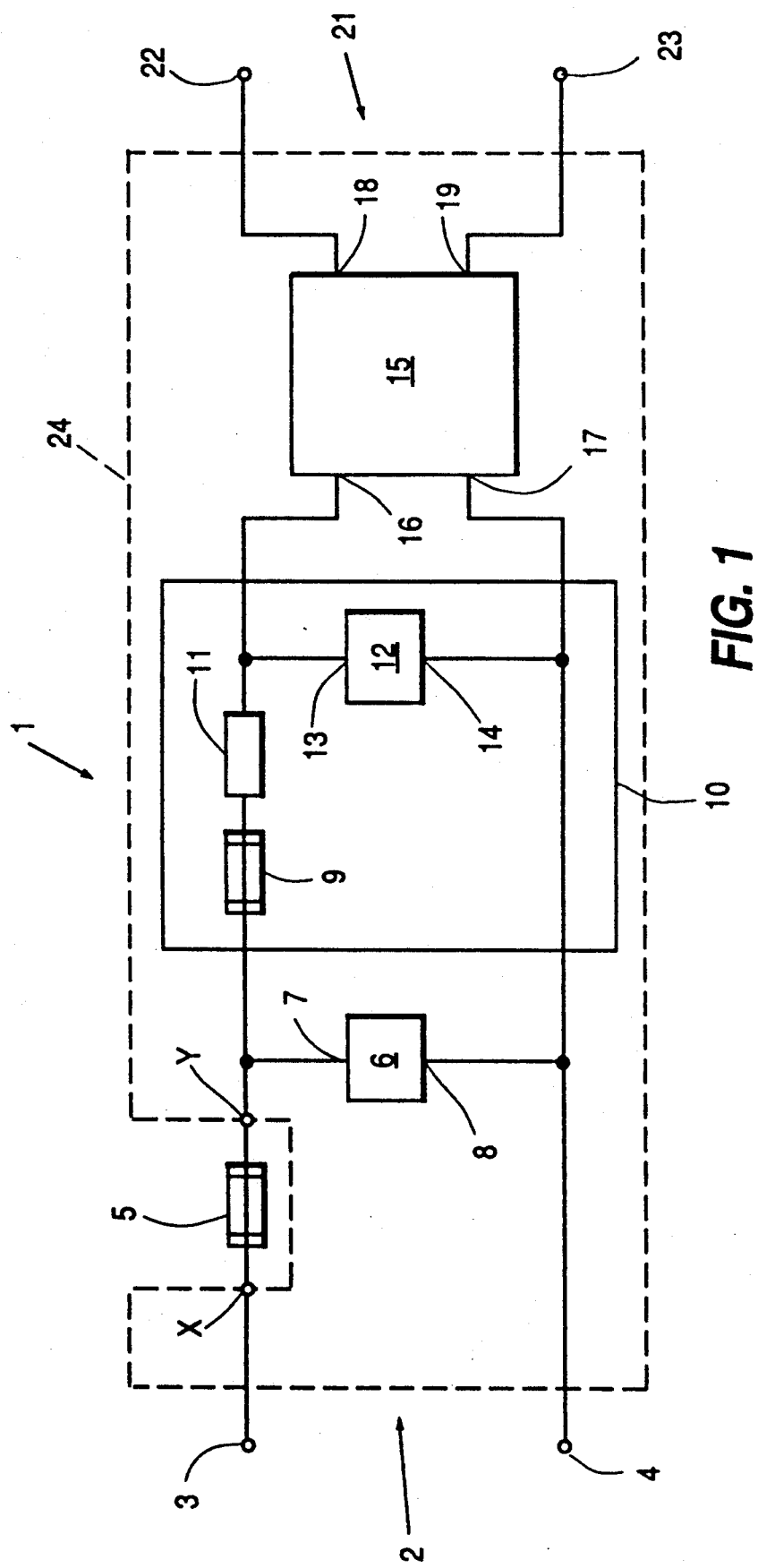
FIG. 1 is a basic block circuit diagram of the barrier with an externally accessible fuse.

Referring first to FIG. 1:

The barrier 1 has an input 2 with two input terminals 3, 4. The series circuit of a current interrupter, shown as a fuse 5 and a voltage limiting circuit 6 having terminals 7, 8 is connected in parallel across the input terminals 3, 4. The fuse 5 is connected to the input terminal 3, and the voltage limiting circuit 6, illustrated as a two-terminal device, is connected to the terminal of the fuse 5 remote from the input 3 and to the second input terminal 4. The voltage limiting circuit 6 has an internal resistance which approaches infinity so long as the voltage across the terminals 7, 8 is less than a threshold voltage; the differential inner resistance of the voltage limiting circuit 6, however, drops rapidly to a very low value as soon as the threshold voltage, forming a limit voltage for the circuit 6, is exceeded, even if only slightly.

An internal voltage limiting circuit 10 is connected across the voltage limiting device or circuit 6. The internal voltage limiting circuit 10 is connected across the terminals 7, 8 and includes an internal over-current responsive device, such as a fuse 9, an in-line resistor 11, and a second voltage limiting arrangement 12, having two terminals 13, 14. The voltage limiting arrangement 12, preferably, has the same general transfer characteristic as the voltage limiting device 6. Preferably, both the circuit 12 and the device 6 have the same operating characteristic, and especially the same limiting or threshold values at which, when the threshold is exceeded, the differential inner resistance drops, exponentially, rapidly and reaches values approaching zero.

A current limiting circuit 15 is connected downstream of the voltage limiting circuit 10. The current limiting circuit 15 has terminals 16, 18 and 17, 19; it is connected with its input terminals 16, 17 parallel to the voltage limiting arrangement 12; its output terminals 18, 19 are connected to the output terminals 22, 23 forming the output 21 of the barrier.

The current limiting device 15 limits, in case of a short circuit between the output terminals 22, 23, the maximum short-circuit current to a value which is determined in accordance with the safety standards with which the device is to be used, for example a current value which will not cause heating which might cause an explosion, even if the input voltage at the input 2 is within the maximum design value. In its simplest form, the current limiting device 15 is a series or in-line resistor connected between terminals 16 and 18, as will be described below; the terminals 17, 19 can then merely be cross-connected. Alternatively, the circuit 15 may be an electronic regulating circuit utilizing transistors; the referenced U.S. Pat. No. 4,831,484, by co-inventor Bruch hereof, describes such an electronic regulating circuit suitable for the current limiting device 15.

Safety barriers must be encapsulated. FIG. 1 shows, by the broken line 24, the elements of the safety barrier which are encapsulated. Free from encapsulation, and externally accessible, are the input terminals 3, 4, the output terminals 22, 23 and the current interrupter, that is, the fuse 5. All other elements are included in a housing, inaccessible from the outside and totally encapsulated to prevent tampering or access to any of the elements including the fuse 9. Only fuse 5 can be removed from its terminals and replaced, if necessary. Suitable holding and terminal arrangements X, Y are located in the housing of the barrier 1. Such terminal arrangements are well known and therefore are shown only schematically.

It is not necessary to encapsulate also the voltage limiting device 6; it is thus possible to locate both the fuse 5 as well as the voltage limiting device 6 externally of the totally enclosed safety barrier; or to provide an entirely external fuse 5 or terminals for connection of the fuse 5 thereto.

OPERATION (a) - Normal Conditions: Let it be assumed that a voltage is applied across the terminals of the input 2 which is smaller than the threshold or limit voltage of the voltage limiting device 6 or of the arrangement 12. Output voltage across terminals 22, 23 then will be equal to input voltage, reduced only by the voltage drop across the in-line resistor 11 and a possible voltage drop across the current limiting circuit 15. The voltage limiting circuits 6 and 12 do not influence the voltage at the output 21.

(b) - Over-Voltage at Input 2: Let it next be assumed that, due to a malfunction of the energy supply source for the barrier 1, voltage across the input 2 rises above the threshold value of the voltage limiting circuit 6. The voltage at the output 21 can rise only to a value which corresponds to the respective limit voltages of the voltage limiting circuit 6 or 12. Since the circuit 6, under over-voltage conditions, will have a higher voltage thereacross due to the in-line resistor 11, the resistance of the circuit 6 will drop precipitously, which causes a substantial increase in current flow through the circuit 6, in turn causing the fuse 5 to burn out.

The voltage limiting arrangement 12 may have the same or a higher level of threshold voltage than that of the voltage limiting device 6. Yet, the higher current due to the excess voltage will flow only or primarily through the device 6; the voltage limiting device 12 will have much lower or no current flowing therethrough, with the consequence that the current flowing through the fuse 9 will not be so high that the fuse 9 will burn out. Even if the tolerances of threshold voltages of the respective circuits 6 and 12 have an unfavorable relation, the in-line resistor 11 and/or the inner resistance of the fuse 9 will prevent melt-through of the fuse 9. Consequently, in case of over-voltages, only the externally accessible fuse 5 will burn through, whereas the encapsulated fuse 9 remains intact.

At burn-through of the fuse 5, induction voltages could occur at the input 2 due to inductances of connecting lines leading to the input 2. Even then, the encapsulated fuse 9, which is required by safety provision, is effectively protected. If the fuse 5 for some reason should malfunction, or if the voltage limiting circuit 6 should malfunction, a back-up safety circuit is provided, formed by the fuse 9.

Malfunction of the voltage limiting circuit 6 may occur, for example, to an interruption in a connecting line.

Under ordinary over-voltage conditions, that is, with the barrier operating in accordance with its design, the first voltage limiting circuit 6 operates as a clamping circuit for the subsequent series circuit formed by the resistor 11, the fuse 9 and the voltage limiting arrangement.

Figure 2:
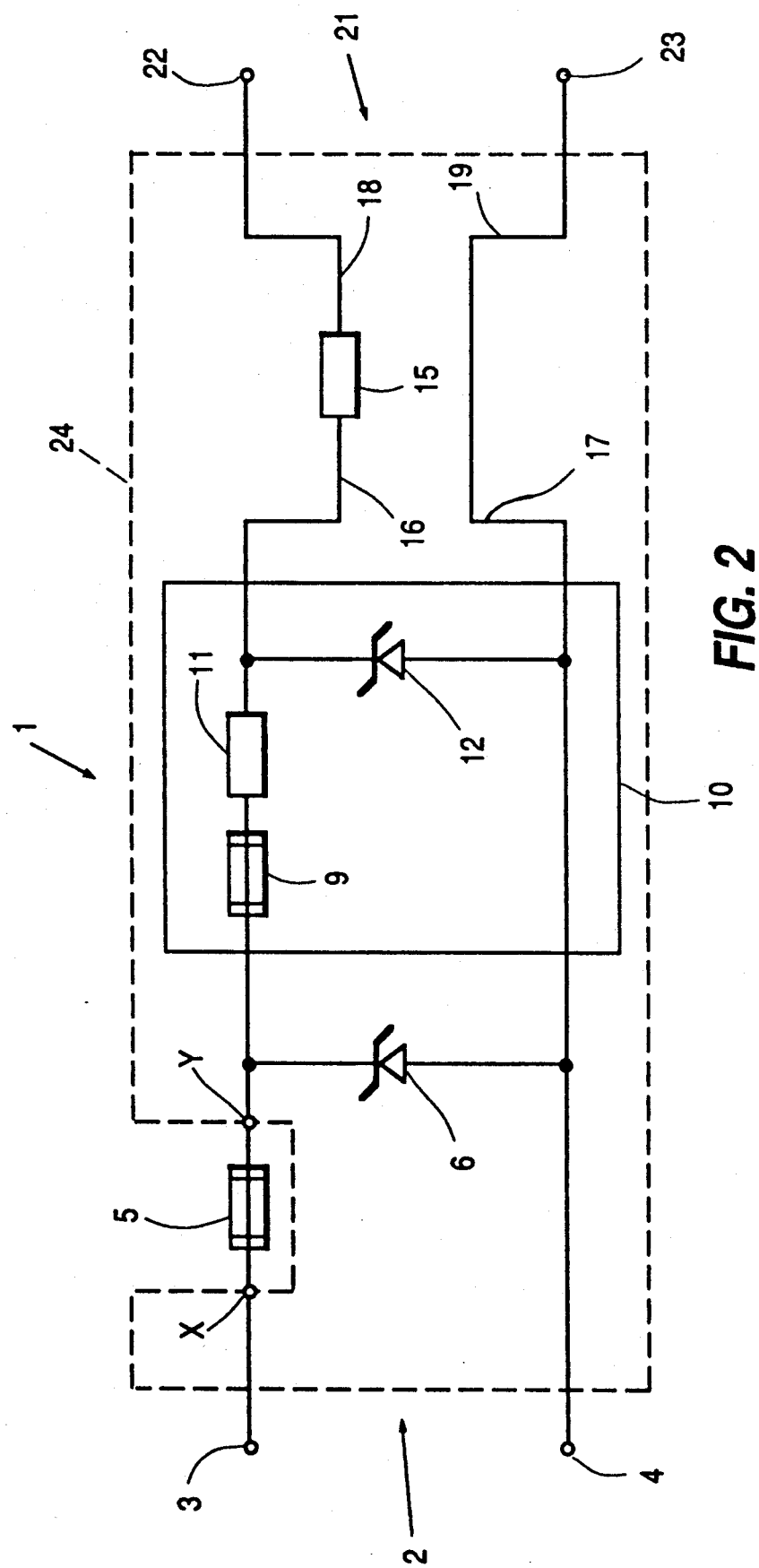
FIG. 2 is a circuit diagram of the barrier with voltage limiting dependently on the polarity of input voltage.

FIG. 2 illustrates a detailed circuit in which the voltage limiting device 6 and the voltage limiting arrangement are formed, in the simplest manner, as two respective Zener diodes 6 and 12, polarized in the same direction. The anodes of the Zener diodes 6 and 12 are connected to the input terminal 4 which, further, is through-connected to the output terminal 23. The Zener diodes have the characteristic of extremely high internal resistance up to the breakdown voltage and then a very low resistance.

Either one of the Zener diodes, and preferably the Zener diode 12, can be formed of a plurality of Zener diode elements, connected in parallel. This is customary design, and required by safety regulations. The referenced U.S. Pat. No. 4,831,484 shows two Zener diodes connected in parallel.

In the simplest form, the current limiting circuit 15 is an in-line resistor, connecting the junction between the in-line protective resistor 11 and the cathode of the Zener diode 12 to the output terminal 22.

The circuit of FIG. 2 is intended for polarized d-c use; FIG. 3 illustrates a circuit which is polarity-independent and also suitable to limit alternating current power to permissible safe values. Zener diode 6 is serially connected with a second Zener diode 6', of reverse polarity. Likewise, Zener diode 12 is serially connected with a Zener diode 12', reversely polarized. Thus, independently of the polarity of the voltage at the input terminal 2, the voltage in which the two serially connected diodes limit the output will be the same.

When the voltages across the input and output are extremely small, normal rectifier diodes can be used, operated in current passing polarity; to extend the range of operation of the barrier, such diodes can already be provided, see diodes 6", 12", and which then would have conductivity thresholds below the Zener voltages of Zener diodes 6, 6'. The diode assembly 6, 6', 6" and 12, 12', 12" can be placed on a printed circuit board and the respective connections to the diodes 6, 6', 12, 12' and 6", 12" interrupted, for example by a laser, prior to encapsulation in dependence on the eventual use to which the barrier is to be put.

The over-current interrupting element 5 need not be a fuse. As shown in FIG. 3a, the fuse can be removed from terminals X, Y and replaced by a cold conductor, i.e. a positive temperature coefficient of resistance resistor 26. Upon occurrence of over-voltage at input 2, the cold conductor 26 heats rapidly and limits the current flowing therethrough and into the barrier circuit to a value which is not dangerous for the Zener diodes 6, 6' nor for the fuse 9. When the over-voltage ceases, and the holding current of the cold-conductive resistor 26 drops below its "hot" value, the circuit automatically reverts to normal operation.

For some installations, it is desirable to disconnect the entire safety circuit until it is manually reset if an over-voltage condition obtains. FIG. 3b illustrates replacement of the fuse 5 by an over-current or circuit breaker relay 27. Similarly to the fuse 5, it will disconnect; yet, it can be manually reset.

The circuit of FIG. 2 is polarity-sensitive. The Zener diodes will then be subjected to voltages in conductive direction. That one, namely Zener diode 6, which is operated in conductive direction, will carry the majority of the current and will limit the voltage for the circuit subsequent thereto, namely for the Zener diode 12 and the series circuit which includes the resistor 11, fuse 9, and the current limiting circuit. The output voltage and the currents which may arise will be in the order of 1V, which is a typical threshold voltage for Zener diodes. The voltage drop on the Zener diode 6 is too small to permit the fuse 9 to burn through; thus, only the fuse 5, or equivalent current interrupting element, will sever the circuit.

It is possible that, as the fuse 5 burns through, induction voltages will arise. This, still, will not damage the encapsulated fuse 9. It could burn through only if the voltage drop across the first Zener diode 6 is so high that current will flow through the encapsulted fuse 9 which is above its limiting value. Assuming that the Zener diode 6 operates as intended, and without malfunction, such a case does not arise in actual practice.

Assuming correct polarity, or the circuit of FIG. 3, input voltages in excess of design values will cause the Zener diode 6 to break down and, correspondingly, a high current will flow through the fuse or equivalent interrupter 5. Looked at electrically, the Zener diode 6 clamps the voltage for the subsequent series circuit formed by the fuse 9 and Zener diode 12 which, due to the steep characteristics of Zener diodes, is effectively independent of the voltage at the input 2 to the barrier circuit 1. This voltage is insufficient to cause current to flow through the encapsulated fuse 9. Rather, the initially provided fuse 5 will respond and, if it burns out, can be exchanged. Even if, upon burn-out, induction voltage peaks would arise, the clamping effect of the Zener diode 6 protects the encapsulated barrier fuse 9.

Merely including an additional fuse in series with the input of the barrier does not provide effective protection for the fuse 9. If, for example due to excessive currents, one of the two fuses would burn through, current change together with the usually present inductances in supply lines and possible loads cause induction voltages which, then, also cause the other fuse to burn out. Merely reducing the threshold current level of the additional fuse does not solve the problem since the time taken to melt-through the additional fuse is long enough to permit induction voltages to also destroy the fuse 9 unless other elements respond and disconnect the circuit. The addition of the further Zener diode 6, therefore, provides effective protection for the encapsulated fuse 9 in which the accessible fuse 5 may have the same, or higher current carrying capacity than the encapsulated fuse 9.

Various changes and modifications may be made, and features described in connection with any one of the embodiments may be used with any of the others, within the scope of the inventive concept.

We claim:

1. Safety barrier having
an input (2) including two input terminals (3, 4) and an output (21) including two output terminals (22, 23), and a barrier circuit (10, 15) limiting the voltage across the output and the current flowing through the output,
wherein at least part of said barrier circuit forms a sealed, encapsulated unit (24);
said barrier circuit comprising
a first voltage limiting circuit (12);
a first current limiting circuit (15) serially connected between the voltage limiting circuit and at least one (22) of the output terminals; and
an in-line fuse (9) located within said sealed unit (24) and inaccessible from the outside thereof, serially connected between one (3) of the input terminals, and the voltage limiting circuit (12),
wherein means are provided for protecting said encapsulated unit against overvoltages and surges, comprising
a series circuit including
an externally accessible high current interrupting means (5, 26, 27) connected to one of the input terminals and
a second voltage limiting circuit (6);
said first voltage limiting circuit (10) having an input which is connected to said second voltage limiting circuit (6);
said high current interrupting means (5, 26, 27) being connected between said second voltage limiting circuit (6) and one (3) of the input terminals and thereby connecting said first voltage limiting circuit through said high current interrupting means (5, 26, 27) to said one (3) of the input terminals;
wherein the current interruption threshold of the externally accessible high current interrupting means (5, 26, 27) is at least as high as the interruption threshold of said in-line encapsulated fuse (9); and
wherein said high current interrupting means (5, 26, 27) is accessible externally of said sealed, encapsulated unit (24).

2. The barrier of claim 1, wherein the voltage threshold limits of said first voltage limiting circuit (10) and of said second voltage limiting circuit (6), at least at a given polarity of voltages connected to the input (2), are the same, subject to tolerances, for limiting voltage across said circuits to said threshold values.

3. The barrier of claim 1, wherein the second voltage limiting circuit (6) and the first voltage limiting circuit (10) both have limiting voltage threshold which, at a given polarity of voltage connected to the input (2), is higher than when said polarity is reversed.

4. The barrier of claim 1, wherein the voltage thresholds of the second voltage limiting circuit (6) and of the first voltage limiting circuit (10) are identical, subject to tolerances, and independent of the polarity of the voltage across the input (2).

5. The barrier of claim 1, wherein the externally accessible high current interrupting means comprises a fuse (5).

6. The barrier of claim 5, wherein both the in-line fuse (9) and said externally accessible fuse (5) are melt-through fuses.

7. The barrier of claim 1, wherein the externally accessible high-current interrupting means comprises a positive temperature coefficient resistor, or cold conductor.

8. The barrier of claim 1, wherein the externally accessible high current interrupting means comprises a circuit breaker (27).

9. The barrier of claim 1, wherein the current response time of the externally accessible high current interrupting means (5, 26, 27) is longer than the current response time of said in-line fuse (9).

10. The barrier of claim 1, wherein the second voltage limiting circuit (6) has a limiting threshold level which is smaller than the maximum voltage at which said in-line fuse (9) responds and burns out.

11. The barrier of claim 1, wherein at least one of: the first voltage limiting circuit (10); the second voltage limiting circuit (6); include at least one Zener diode (6, 6'; 12, 12').

12. The barrier of claim 1, wherein at least one of: the first voltage limiting circuit (10); the second voltage limiting circuit (6); include at least a diode (6'', 12'').

13. The barrier of claim 1, wherein said second voltage limiting circuit (6) is located externally of said sealed, encapsulated unit (24).

14. The barrier of claim 1, wherein the current response characteristics of said externally accessible current interrupting means (5, 26, 27) and of said in-line fuse (9) are, subject to tolerances, identical.

15. The barrier of claim 1, wherein the current response characteristics of said externally accessible high current interrupting means (5, 26, 27) is higher than the current level at which the in-line fuse (9) responds.

* * * * *